US010972933B2

(12) United States Patent
Hampel et al.

(10) Patent No.: US 10,972,933 B2
(45) Date of Patent: Apr. 6, 2021

(54) QOS SUPPORT IN WIRELESS BACKHAUL NETWORKS USING CELLULAR RADIO-ACCESS TECHNOLOGIES

(71) Applicant: QUALCOMM Incorporated, San Diego, CA (US)

(72) Inventors: Karl Georg Hampel, Hoboken, NJ (US); Hong Cheng, Bridgewater, NJ (US); Junyi Li, Chester, NJ (US); Navid Abedini, Somerset, NJ (US); Muhammad Nazmul Islam, Littleton, MA (US); Jianghong Luo, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 16/273,610

(22) Filed: Feb. 12, 2019

(65) Prior Publication Data

US 2019/0289492 A1    Sep. 19, 2019

Related U.S. Application Data

(60) Provisional application No. 62/645,095, filed on Mar. 19, 2018.

(51) Int. Cl.
*H04B 7/155*    (2006.01)
*H04W 28/02*    (2009.01)
(Continued)

(52) U.S. Cl.
CPC ... *H04W 28/0268* (2013.01); *H04W 28/0252* (2013.01); *H04W 28/0263* (2013.01);
(Continued)

(58) Field of Classification Search
None
See application file for complete search history.

(56) References Cited

U.S. PATENT DOCUMENTS

2017/0331670 A1\* 11/2017 Parkvall ............... H04B 7/0695
2018/0049190 A1\* 2/2018 Abedini ............... H04B 7/0695
(Continued)

OTHER PUBLICATIONS

Huawei: "Adaptation Layer Based L2 Relaying and Light L2 Relaying", 3GPP Draft; R3-180814 Adaptation Layer Based L2 Relaying and Light L2 Relaying, 3rd Generation Partnership Project (3GPP), Mobile Competence Centre; 650, Route Des Lucioles ; F-06921 Sophia-Antipolis, vol. RAN WG3, No. Athens, Greece; Feb. 26, 2018-Mar. 2, 2018, Feb. 14, 2018 (Feb. 14, 2018), XP051401227, 6 Pages, Retrieved from the Internet: URL:http://www.3gpp.org/ftp/tsg%5Fran/WG3%5Flu/TSGR3%5F99/Docs/ [retrieved on Feb. 14, 2018], pp. 1-4.
(Continued)

*Primary Examiner* — Ajit Patel
(74) *Attorney, Agent, or Firm* — Arent Fox LLP

(57) ABSTRACT

A relay node at a base station may configure a first radio channel with a first priority and a first priority ID, and configure a second radio channel with a second priority and a second priority ID. The base station may configure a third radio channel with a first bearer ID and a first mapping to the first priority, and configure a fourth radio channel with a second bearer ID and a second mapping to the second priority. The relay node may forward packets from the third radio channel to the first radio channel based on the first mapping and insert the first priority ID into a header in the packets. The relay node may forward packets from the fourth radio channel to the second radio channel based on the second mapping, and insert the second priority ID into a header in the packets.

40 Claims, 11 Drawing Sheets

(51) Int. Cl.
*H04W 88/14* (2009.01)
*H04W 76/11* (2018.01)
*H04W 72/10* (2009.01)
*H04W 76/12* (2018.01)
*H04W 88/18* (2009.01)
*H04W 28/24* (2009.01)
*H04W 40/22* (2009.01)

(52) U.S. Cl.
CPC .......... *H04W 28/24* (2013.01); *H04W 40/22* (2013.01); *H04W 72/10* (2013.01); *H04W 76/11* (2018.02); *H04W 76/12* (2018.02); *H04W 88/14* (2013.01); *H04W 88/18* (2013.01)

(56) References Cited

U.S. PATENT DOCUMENTS

| | | | | |
|---|---|---|---|---|
| 2018/0092139 | A1* | 3/2018 | Novlan | H04W 56/001 |
| 2019/0215055 | A1* | 7/2019 | Majmundar | H04W 40/12 |
| 2019/0253136 | A1* | 8/2019 | Makki | H04W 72/0446 |
| 2020/0163103 | A1* | 5/2020 | Kuang | H04W 72/04 |

OTHER PUBLICATIONS

Huawei et al., "Discussion on IAB Topologies", 3GPP Draft; R2-1801133 Discussion on IAB Topologies, 3rd Generation Partnership Project (3GPP), Mobile Competence Centre ; 650, Route Des Lucioles ; F-06921Sophia-Antipolis Cedex ; France, vol. RAN WG2, No. Vancouver, Canada;Jan. 22, 2017-Jan. 26, 2017, Jan. 12, 2018 (Jan. 12, 2018), XP051386604, 3 Pages,Retrieved from the Internet: URL:http://www.3gpp.org/ftp/tsg%5Fran/WG2%5FRL2/TSGR2%5FAHs/2018%5F01%5FNR/Docs/ [retrieved on Jan. 12, 2018].

Huawei: "Overview on Support of IAB", 3GPP Draft; R3-180815 Considerations on Support of IAB, 3rd Generation Partnership Project (3GPP), Mobile Competence Centre ; 650, Route Des Lucioles ; F-06921 Sophia-Antipolis Cedex ; France, vol. RAN WG3, No. Athens, Greece; Feb. 26, 2018-Mar. 2, 2018, Feb. 14, 2018 (Feb. 14, 2018), XP051401228, 5 Pages, Retrieved from the Internet: URL:http://www.3gpp.org/ftp/tsg%5Fran/WG3%5Flu/TSGR3%5F99/Docs/ [retrieved on Feb. 14, 2018], pp. 2-4.

International Search Report and Written Opinion—PCT/US2019/017865—ISA/EPO—Apr. 23, 2019.

Nokia et al., "Architecture and Protocols: MAC Adaptation Layer Based IAB", 3GPP Draft; R3-180993 MAC Adapt Based IAB Protocol Architecture, 3rd Generation Partnership Project (3GPP), Mobile Competence Centre ; 650, Route Des Lucioles ; F-06921 Sophia-Antipolis Cedex ; France, vol. RAN WG3, No. Athens, Greece; Feb. 26, 2018-Mar. 2, 2018, Feb. 17, 2018 (Feb. 17, 2018), XP051401627, 6 Pages, Retrieved from the Internet: URL:http://www.3gpp.org/ftp/tsg%5Fran/WG3%5Flu/TSGR3%5F99/Docs/ [retrieved on Feb. 17, 2018].

Qualcomm Incorporated: "IAB—User-Plane Aspects", 3GPP Draft; R2-1800413 IAB User Plane Aspects, 3rd Generation Partnership Project (3GPP), Mobile Competence Centre ; 650, Route Des Lucioles ; F-06921 Sophia-Antipolis Cedex ; France, vol. RAN WG2, No. Vancouver, Canada; Jan. 22, 2018-Jan. 26, 2018, Jan. 11, 2018 'Jan. 11, 2018), XP051385718, 4 Pages, Retrieved from the Internet: URL:http://www.3gpp.org/ftp/tsg%5Fran/WG2%5FRL2/TSGR2%5FAHs/2018%5F01%5FNR/Docs/ [retrieved on Jan. 11, 2018].

* cited by examiner

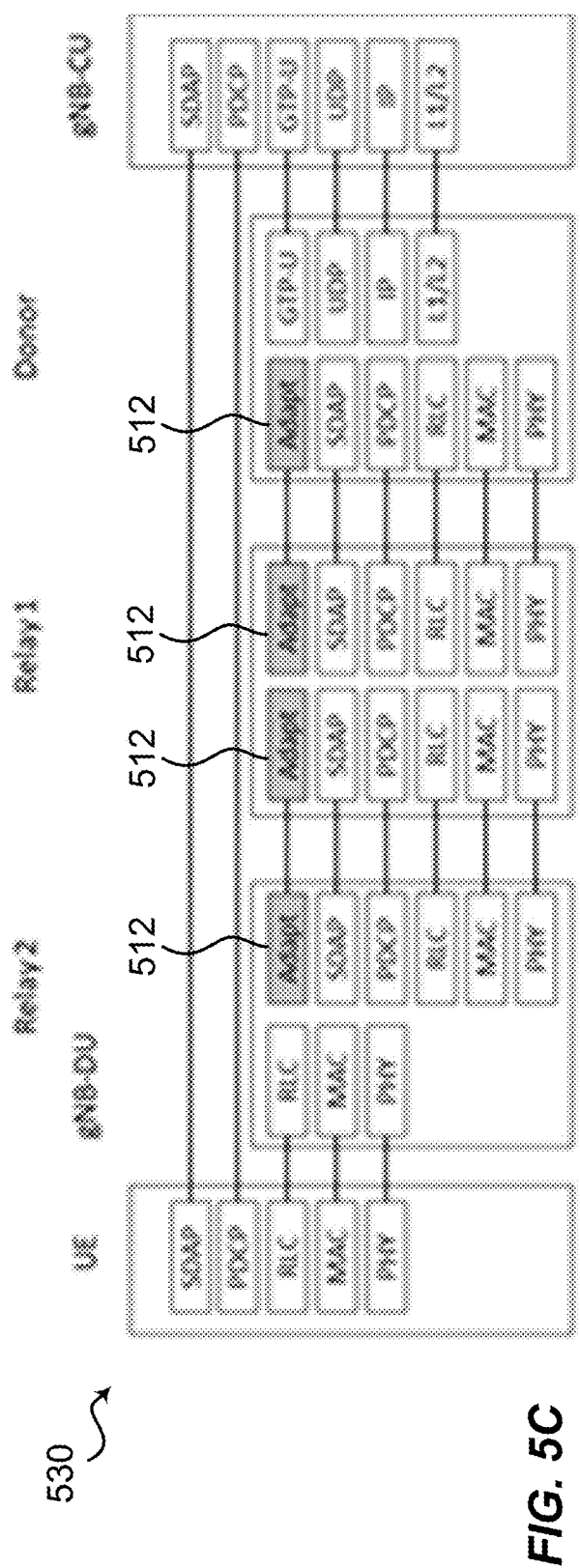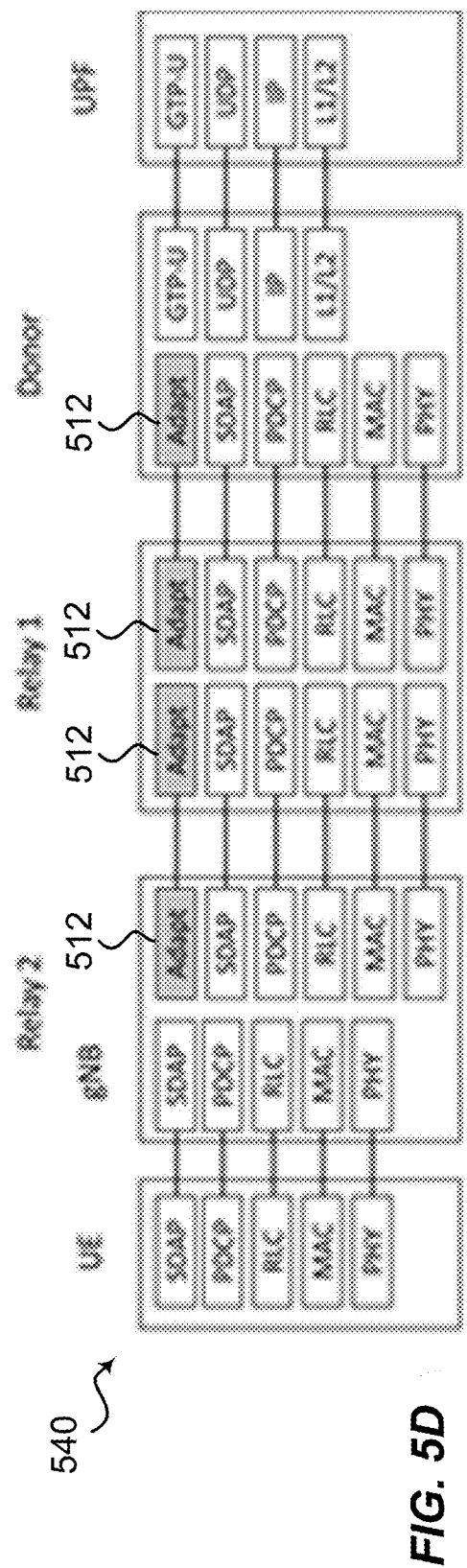
FIG. 5C
FIG. 5D

QOS SUPPORT IN WIRELESS BACKHAUL NETWORKS USING CELLULAR RADIO-ACCESS TECHNOLOGIES

CLAIM OF PRIORITY UNDER 35 U.S.C. § 119

This application claims priority to U.S. Provisional Application No. 62/645,095, titled "QOS SUPPORT IN WIRELESS BACKHAUL NETWORKS USING CELLULAR RADIO-ACCESS TECHNOLOGIES," filed Mar. 19, 2018, which is assigned to the assignee hereof, and incorporated herein by reference in its entirety.

BACKGROUND

Aspects of the present disclosure relate generally to wireless communication networks, and more particularly, to wireless backhaul networks.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current backhaul solutions may not provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method of wireless communications for a relay node to provide quality of service (QoS) over a wireless backhaul. The method may include receiving a configuration for a first radio channel with a first priority and a first priority ID, and receiving a configuration for a second radio channel with a second priority and a second priority ID. The method may include receiving a configuration for a third radio channel with a first bearer ID and a first mapping to the first priority, and receiving a configuration for a fourth radio channel with a second bearer ID and a second mapping to the second priority. The method may include forwarding packets from the third radio channel to the first radio channel based on the first mapping and inserting the first priority ID into a header in the packets from the third radio channel. The method may include forwarding packets from the fourth radio channel to the second radio channel based on the second mapping, and inserting the second priority ID into a header in the packets from the fourth radio channel.

In an aspect, the present disclosure provides a base station. The base station may include a memory and a processor in communication with the memory. The processor may be configured to receive a configuration for a first radio channel with a first priority and a first priority ID, and receiving a configuration for a second radio channel with a second priority and a second priority ID. The processor may be configured to receive a configuration for a third radio channel with a first mapping to the first priority, and receiving a configuration for a fourth radio channel with a second mapping to the second priority. The processor may be configured to forward packets from the third radio channel to the first radio channel based on the first mapping and inserting the first priority ID into a header in the packets from the third radio channel. The processor may be configured to forward packets from the fourth radio channel to the second radio channel based on the second mapping, and inserting the second priority ID into a header in the packets from the fourth radio channel.

In another aspect, the present disclosure provides another base station. The base station may include means for receiving a configuration for a first radio channel with a first priority and a first priority ID, and receiving a configuration for a second radio channel with a second priority and a second priority ID. The base station may include means for receiving a configuration for a third radio channel with a first mapping to the first priority, and receiving a configuration for a fourth radio channel with a second mapping to the second priority. The base station may include means for forwarding packets from the third radio channel to the first radio channel based on the first mapping and inserting the first priority ID into a header in the packets from the third radio channel. The base station may include means for forwarding packets from the fourth radio channel to the second radio channel based on the second mapping, and inserting the second priority ID into a header in the packets from the fourth radio channel.

In another aspect, the present disclosure provides a non-transitory computer-readable medium storing computer code executable by a processor for wireless communications. The non-transitory computer-readable medium may include one or more codes executable to receive a configuration for a first radio channel with a first priority and a first priority ID, and receiving a configuration for a second radio channel with a second priority and a second priority ID. The non-transitory computer-readable medium may include one or more codes executable to receive a configuration for a third radio channel with a first mapping to the first priority, and receiving a configuration for a fourth radio channel with a second mapping to the second priority. The non-transitory computer-readable medium may include one or more codes executable to forward packets from the third radio channel to the first radio channel based on the first mapping and inserting the first priority ID into a header in the packets from the third radio channel. The non-transitory computer-readable medium may include one or more codes executable to forward packets from the fourth radio channel to the second radio channel based on the second mapping, and inserting the second priority ID into a header in the packets from the fourth radio channel.

In an aspect, the present disclosure includes a method of wireless communications for a donor node. The method may include receiving a configuration for a first backhaul radio channel with a first priority and a first priority ID, and receiving a configuration for a second backhaul radio channel with a second priority and a second priority ID. The method may include receiving a configuration for a first tunnel with a first bearer ID and a first mapping to the first priority, and receiving a configuration for a second tunnel with a second bearer ID and a second mapping to the second priority. The method may include forwarding packets from the first tunnel to the first backhaul radio channel based on the first mapping, and inserting the first priority ID into a header in the packets from the first tunnel. The method may include forwarding packets from the second tunnel to the second backhaul radio channel based on the second mapping, and inserting the second priority ID into a header in the packets from the second tunnel.

In another aspect, the present disclosure includes a base station, which may be a donor node. The base station may include a memory and a processor in communication with the memory. The processor may be configured to receive a configuration for a first backhaul radio channel with a first priority and a first priority ID, and receiving a configuration for a second backhaul radio channel with a second priority and a second priority ID. The processor may be configured to receive a configuration for a first tunnel with a first bearer ID and a first mapping to the first priority, and receiving a configuration for a second tunnel with a second bearer ID and a second mapping to the second priority. The processor may be configured to forward packets from the first tunnel to the first backhaul radio channel based on the first mapping, and inserting the first priority ID into a header in the packets from the first tunnel. The processor may be configured to forward packets from the second tunnel to the second backhaul radio channel based on the second mapping, and inserting the second priority ID into a header in the packets from the second tunnel.

In another aspect, the present disclosure includes another base station, which may be a donor node. The base station may include means for receiving a configuration for a first backhaul radio channel with a first priority and a first priority ID, and receiving a configuration for a second backhaul radio channel with a second priority and a second priority ID. The base station may include means for receiving a configuration for a first tunnel with a first bearer ID and a first mapping to the first priority, and receiving a configuration for a second tunnel with a second bearer ID and a second mapping to the second priority. The base station may include means for forwarding packets from the first tunnel to the first backhaul radio channel based on the first mapping, and inserting the first priority ID into a header in the packets from the first tunnel. The base station may include means for forwarding packets from the second tunnel to the second backhaul radio channel based on the second mapping, and inserting the second priority ID into a header in the packets from the second tunnel.

In another aspect, the present disclosure provides A non-transitory computer-readable medium storing computer code executable by a processor for wireless communications. The non-transitory computer-readable medium may include one or more codes executable to receive a configuration for a first backhaul radio channel with a first priority and a first priority ID, and receiving a configuration for a second backhaul radio channel with a second priority and a second priority ID. The non-transitory computer-readable medium may include one or more codes executable to receive a configuration for a first tunnel with a first bearer ID and a first mapping to the first priority, and receiving a configuration for a second tunnel with a second bearer ID and a second mapping to the second priority. The non-transitory computer-readable medium may include one or more codes executable to forward packets from the first tunnel to the first backhaul radio channel based on the first mapping, and inserting the first priority ID into a header in the packets from the first tunnel. The non-transitory computer-readable medium may include one or more codes executable to forward packets from the second tunnel to the second backhaul radio channel based on the second mapping, and inserting the second priority ID into a header in the packets from the second tunnel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIGS. 5A-5D are diagrams illustrating example protocol stacks including an adaptation layer;

DETAILED DESCRIPTION

Figure 1A:
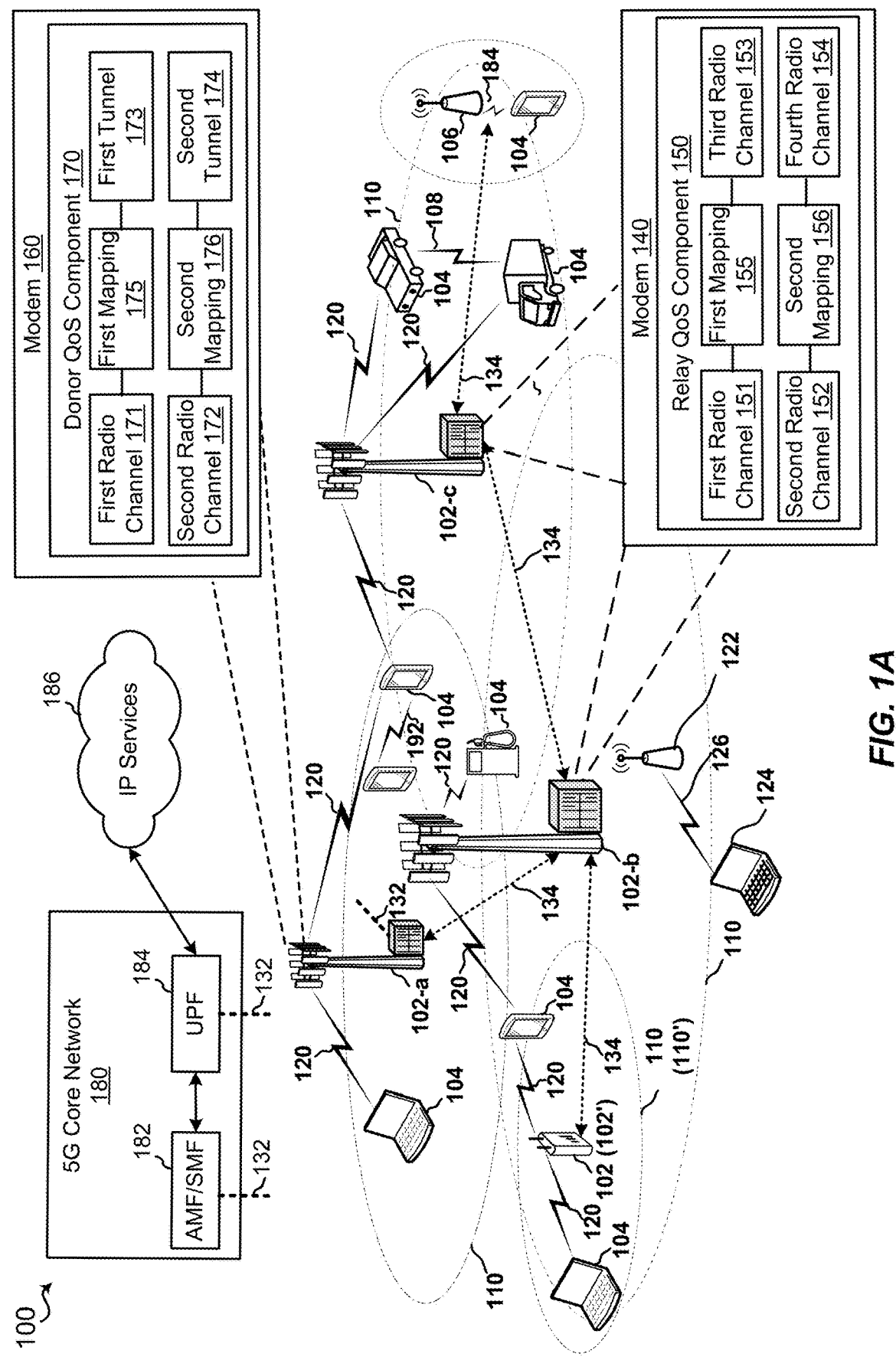
FIG. 1A is a schematic diagram of an example wireless communication network having nodes including relay QoS components and/or donor QoS components configured according to the present disclosure to provide QoS over a wireless backhaul.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to wireless backhaul networks using cellular radio access technologies (RAT) such as Integrated-Access and Backhaul (IAB) networks. The present disclosure also applies to self-backhauling using cellular technologies.

More specifically, the present disclosure addresses a problem relating to quality of service (QoS) support in such wireless backhaul networks. User equipment (UE) accessing a cellular network through a wireless relay may have demand for different QoS classes. Cellular RATs support such QoS differentiation via the concept of bearers, where each bearer carries a unique QoS-class-specific priority. On the access link of the UE, the QoS-class priorities of the various bearers are enforced by the MAC-layer scheduler. In order to provide QoS differentiation in a wireless backhaul network, QoS-prioritization also needs to be applied to the backhaul link, since the wireless medium is shared among traffic flows pertaining to different QoS-classes. Currently, there is no mechanism for providing QoS over a wireless backhaul link consistently with the access link. Accordingly, there is need for a QoS mechanism that applies access link QoS classes to a wireless backhaul link. Such QoS mechanism should not significantly increase signaling overhead. For example, the QoS mechanism should not require additional user plane traffic. The present disclosure provides such a mechanism.

Generally, the present disclosure describes an L2-relaying solution with centralized control. A set of service classes is established by a controller for the wireless backhaul. Additionally, the controller establishes, on each backhaul link, a separate RLC-channel (or radio bearer) for each QoS class. When a UE accesses a relay, the controller configures a mapping between each of the UE's access RLC-channels and the corresponding QoS-classes supported on the backhaul links on the relay and a donor communicatively coupled with a wireline (and any intermediate nodes). Forwarding packets between the relay and the donor across the backhaul network may be based on a QoS-class identifier, which is carried in an adaptation-layer header inserted into the L2 header stack. The adaptation-layer header may further include a bearer ID, a routing ID, and other information. The adaptation-layer header may reside above or below a radio link control (RLC) header, or may be merged with the RLC header. The adaptation-layer header may also reside above a packet data convergence protocol (PDCP) header or a service data adaptation protocol (SDAP) header or be merged with one of these headers. The adaptation-layer header may also be split into two sub-layers, e.g., where one sub-layer carries end-to-end information such as the bearer ID while the other sub-layer carries the QoS-class ID and the routing ID, which is evaluated hop-by-hop. For example, each relay node may need to evaluate the QoS-class ID or the routing ID to determine a next hop, but the bearer ID may only be used by a core network.

In an aspect, the present disclosure is applicable for central unit (CU)—distributed unit (DU) split architecture, where each relay holds a gNB-DU for access and supports RLC channels or radio bearers on each backhaul link. The disclosure is also applicable to scenarios where each relay holds full gNB functionality on the relay for UE-access.

Additional features of the present aspects are described in more detail below with respect to FIGS. 1-9.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes LTE/LTE-A and 5G systems for purposes of example, and LTE and 5G terminology is used in much of the description below, although the techniques may be applicable to other next generation communication systems.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one base station 102-*b*, 102-*c* with a modem 140 having a relay QoS component 150 that provides QoS over a wireless backhaul 134. As illustrated, the base stations 102-*b* and 102-*c* may not have a direct backhaul link 132 (e.g., NG interface) to the 5G core network 180. The term "relay node" may refer to a base station without a direct backhaul link to a core network. In contrast, the term "donor node" may refer to a base station with a direct backhaul link to the core network. Further, the wireless communication network 100, also referred to as a wireless wide area network (WWAN), includes at least one base station 102-a with a modem 160 having a donor QoS component 170 that provides QoS for a wireless backhaul 134. The base station 102-a may be a donor node that includes a backhaul link 132 to the core network 180. The relay nodes of base stations 102-b and 102-c may establish the wireless backhaul 134 via the donor node of base station 102-a. As discussed in further detail below, the base stations 102 may each be configured with mappings for differentiating packets for transmission over the wireless backhaul 134. Thus, according to the present disclosure, the base stations 102 may provide QoS differentiation over the wireless backhaul 134.

The base stations 102 (which may alternatively be referred to as gNodeBs (gNB)) interface with the 5G core network 180 through backhaul links 132 (e.g., NG interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the 5G core network 180) with each other over backhaul links 132, 134 (e.g., X2 interface). The backhaul links 132, 134 may be wired or wireless. In an aspect, the present disclosure relates to a network where at least some of the backhaul links 134 are wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs) and/or gNBs, which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Y*x MHz (where x is a number of component carriers) used for transmission in each direction. The carriers may or may not be adjacent to or contiguous with each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 108. The D2D communication link 108 may use the DL/UL WWAN spectrum. The D2D communication link 108 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 122 in communication with Wi-Fi stations (STAs) 124 via communication links 126 in a 5 GHz unlicensed frequency spectrum. When communicating in an unlicensed frequency spectrum, the STAs 124/AP 122 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 122. The small cell 102', employing NR in an unlicensed frequency spectrum, may boost coverage to and/or increase capacity of the access network.

The gNodeB (gNB) 106 may operate in millimeter wave (mmW) frequencies and/or near mmW frequencies in communication with the UE 104. When the gNB 106 operates in mmW or near mmW frequencies, the gNB 106 may be referred to as a mmW base station. In an aspect, the gNB 106 may be a gNB distributed unit (gNB-DU) connected to another base station 102 via a wireless backhaul 134. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW gNB 106 may utilize beamforming 184 with the UE 104 to compensate for the extremely high path loss and short range.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the 5G core network 180 for one or more UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 104 and the base stations 102. The RRC protocol layer may also be used for core network 180 support of radio bearers for the user plane data. At the physical (PHY) layer, the transport channels may be mapped to physical channels.

In an aspect, the base stations 102-b and 102-c may be relay nodes where the modem 140 includes a relay QoS component 150 that maps QoS differentiated data packets between radio channels. For example, the base station 102-c may be an access relay node that maps radio access channels to radio backhaul channels and the base station 102-b may be an intermediate relay node that maps backhaul radio channels with a first peer base station (e.g., base station 102-c) to backhaul radio channels with a second peer base station (e.g., base station 102-a). A peer base station may refer to a base station with which the base station has established a backhaul link. The relay QoS component 150 may include, for example, a configured first radio channel 151 and a configured second radio channel 152 that provide different QoS levels to a UE 104. The relay QoS component 150 may further include a configured third radio channel 153 and a configured fourth radio channel 154 that provide different QoS levels over a wireless backhaul 134 to a peer base station. The relay QoS component 150 may be configured with a first mapping 155 that maps packets from the first radio channel 151 to the third radio channel 153. The relay QoS component 150 may be configured with a second mapping 156 that maps packets from the second radio channel 152 to the fourth radio channel 154.

In an aspect, the base station 102-a may be a donor node where the modem 160 includes a donor QoS component 170 that maps QoS differentiated data packets between radio channels and tunnels. The donor QoS component 170 may include, for example, a configured first radio channel 171 and a configured second radio channel 172 that provide different QoS levels over a wireless backhaul 134 (e.g., to base station 102-b). The donor QoS component 170 may further include a configured first tunnel 173 and a configured second tunnel 174 that provide different QoS levels over a wired backhaul link 132 to a core network 180. The donor QoS component 170 may be configured with a first mapping 175 that maps packets from the first radio channel 171 to the first tunnel 173. The donor QoS component 170 may be configured with a second mapping 176 that maps packets from the second radio channel 172 to the second tunnel 174. As explained in further detail below, by mapping packets between radio channels and/or tunnels, the donor QoS component 170 and the relay QoS component 150 may establish end-to-end QoS control over the wireless backhaul 134.

The base stations 102 and the UEs 104 are able to communicate to a network through a 5G core network 180. The core network 180 may include an Access and Mobility Management Function/Session Management Function (AMF/SMF) entity 182, User Plane Function (UPF) 184 and other entity or components for communicating packet data units (PDUs).

Figure 1B:
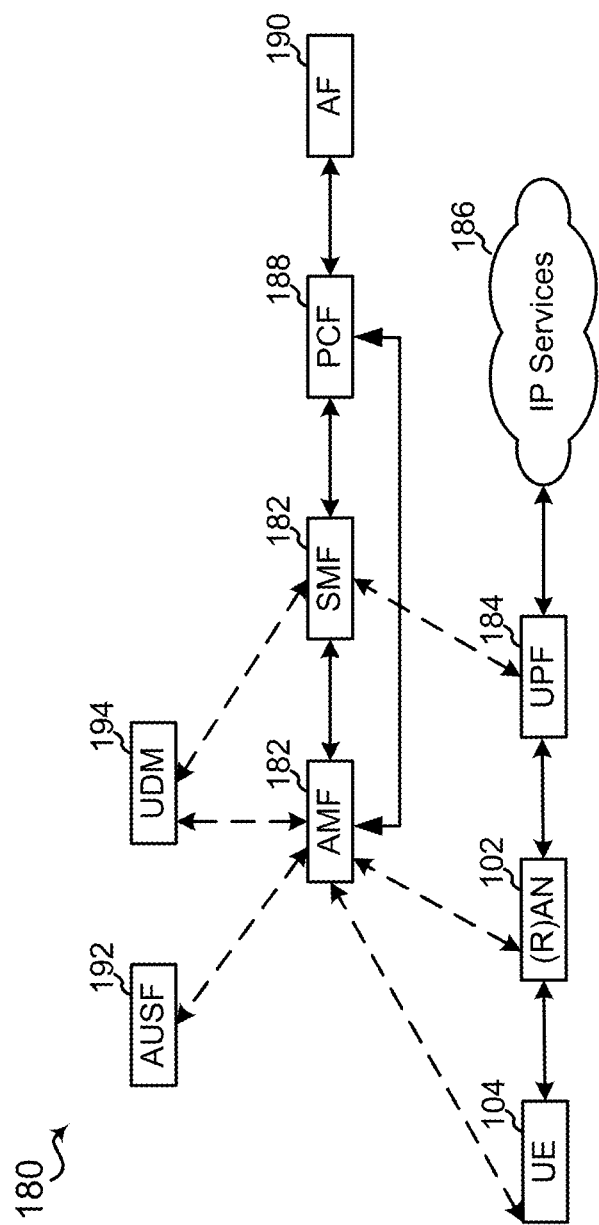
FIG. 1B is a schematic diagram of an example 5G core network.

Referring to FIG. 1B, a schematic diagram of the 5G core network 180 is illustrated. As shown, the 5G core network 180 may include an Authentication Server Function (AUSF) 192, Unified Data Management (UDM) 194, AMF/SNIF entity 182 (shown as two elements), Policy Control Information (PCF) 188 and Application Function (AF) 190, as well as other components for a network (e.g., IP Services 186) to communicate with a UE 104 and a random access network (RAN) (which can include one or more base stations 102).

The AMF 182 provides several functions including, but not limited to, registration management, connection management, reachability management, mobility management, access authentication, access authorization, location services management, and EPS bearer ID allocation. The SMF 182 provides several functions including, but not limited to, session management, UE IP address allocation and management, ARP proxying and/or neighbor solicitation proxying, selection and control of UP function, configures traffic steering at UPF to route traffic to proper destinations, termination of interfaces towards policy control functions, lawful intercepts, control and coordination of charging data collection at the UPF, termination of SM parts of NAS messages, downlink data notification and roaming functionality. The UPF 184 provides several functions including, but not limited to, anchor point for intra/inter-RAT mobility, external PDU session point of interconnect to data network (e.g., IP services 186), packet inspection, user plane part of policy rule information, lawful intercepts, traffic usage reporting, QoS handling for user plane, uplink traffic verification, transport level packet marking in the uplink and downlink, sending and forwarding one or more "end marker," and ARP proxying and/or neighbor soliciting proxying. The AUSF 192 handles authentication of the components within the 5G core network 180. The UDM 194 provides several functions including, but not limited to, generation of authentication credentials, user identification handling, access authorization, support for service/session continuity, subscription management and SMS management. The PCF 188 provides several functions including, but not limited to, support for unified policy framework to govern network behavior, provides policy rules to control plane functions for enforcement, and accesses subscription information relevant for policy decision in the Unified Data Repository (UDR). The AF 190 provides several functions including, but not limited to, application influence on traffic routing, accessing network exposure function and interacting with policy framework for policy control.

Figure 2:
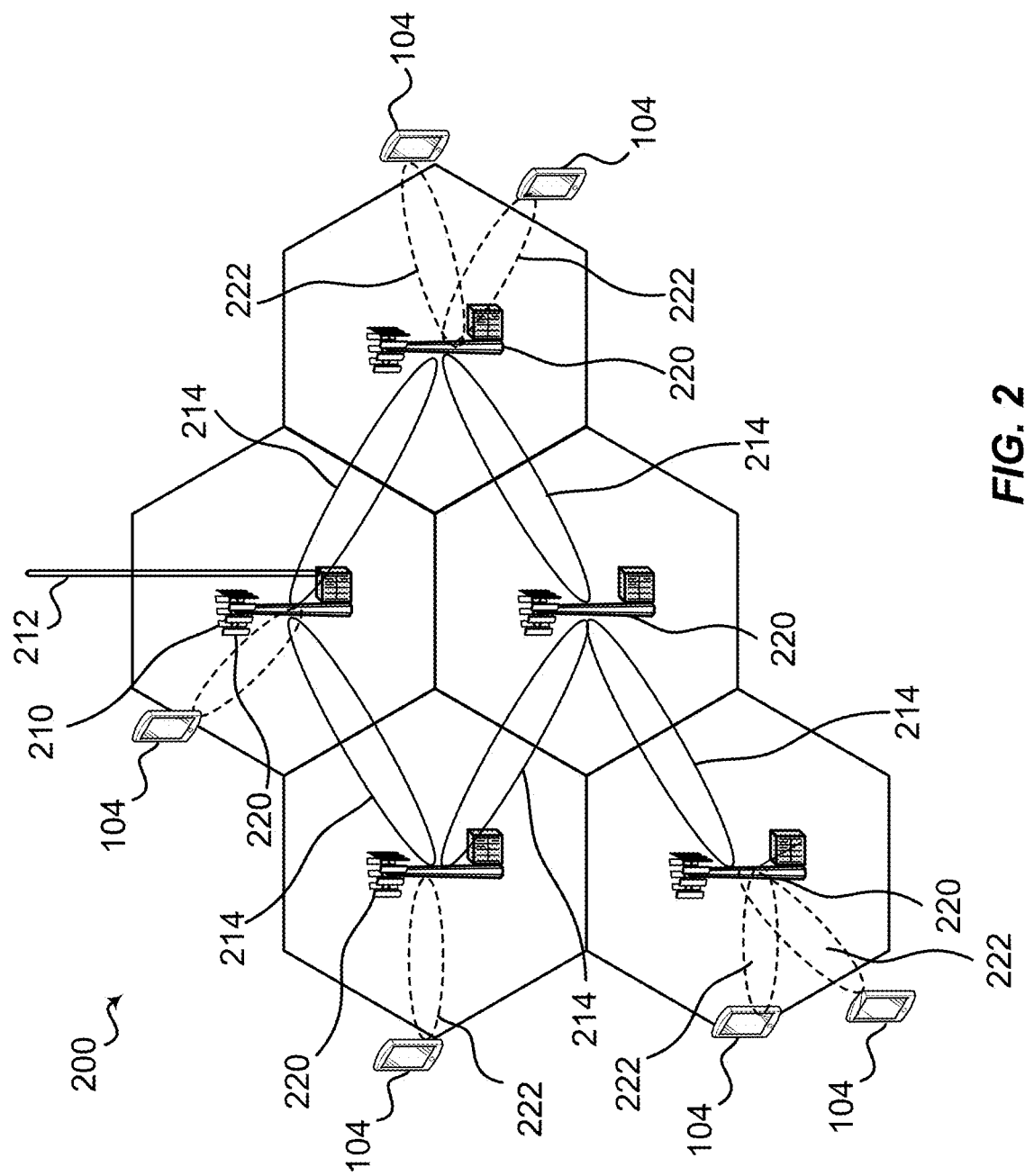
FIG. 2 is a network diagram of an example wireless backhaul network including relay nodes.

Referring to FIG. 2, an example of a wireless backhaul network 200 includes a donor node 210 and several relay nodes 220 providing access to UEs 104. Wireless backhauls 214 can provide range extension to a wireline backhaul 212 or fronthaul. A wireless backhaul network may support multiple backhaul hops as well as redundant connectivity, e.g. by providing multiple paths between a donor node 210 and a relay node 220. In this context, the donor node 210 provides the interface between the wireless network and the wireline network (e.g., 5G core network 180 (FIG. 1A)). One example for wireless backhauling is Integrated Access and Backhaul (IAB) mentioned in 3GPP Rel-15.

Cellular RATs provide QoS differentiation through the bearer concept. An access link 222 can support multiple bearers, such as data radio bearers (DRBs) or signaling radio bearers (SRBs). Each bearer may be assigned a different QoS-class and therefore provide a QoS-class-specific priority in data scheduling on the air interface. The scheduling decisions may include QoS-class prioritization as well as other predicates such as QoS-class-specific bit-rate- and latency guarantees or bit-rate limits. A UE 104 may simultaneously support multiple services pertaining to different QoS-classes through the establishment of multiple bearers where each bearer is assigned with a different QoS class.

Figure 3:
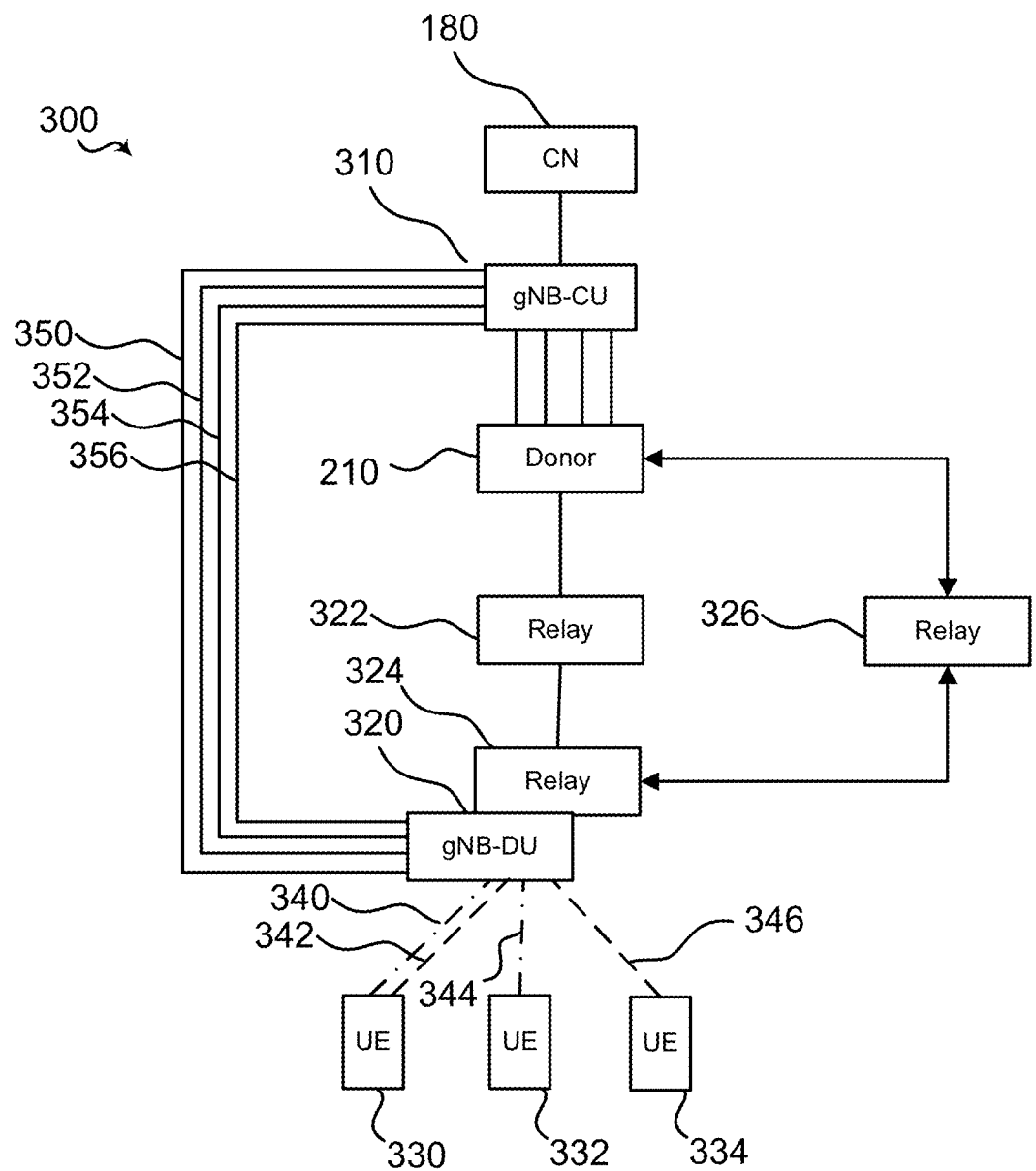
FIG. 3 is a network diagram of an example wireless backhaul network extending a fronthaul between a gNB distributed unit and a gNB central unit.

Referring to FIG. 3, an example of a wireless backhaul network 300 may extend the wireline fronthaul between a gNB-DU 320 (which may reside at a relay node 220) and gNB-CU 310 (which may reside at the donor node 210 or another network location). The wireless backhaul network 300 may include relay nodes 322, 324, 326 and a donor node 210. In this example, UEs 330, 332, 332 (which may be examples of UE 104) are communicatively coupled with the network via the gNB-DU 320 on relay node 324. The UEs 330, 332, 334 sustain radio bearers with the gNB-CU 310, where each radio bearer includes an RLC-channel between a UE 330, 332, or 334 and gNB-DU 320. Each radio bearer may also include a corresponding F1-association 350, 352, 354, 356 between gNB-DU 320 and gNB-CU 310. Further, two QoS classes are used by the UEs in FIG. 3. UE 330 uses both QoS class 1 and QoS class 2 simultaneously via RLC channels 340 and 342 and therefore has two radio bearers established. UE 332 may also use QoS class 1 via RLC channel 344, and UE 334 may use QoS class 2 via RLC channel 346. Accordingly, traffic for UE 330 may share a radio backhaul bearer to gNB-CU 310 with one or both of UE 332 or UE 334.

While a scheduler in the gNB-DU 320 can enforce the priorities associated with these two QoS classes over the RLC channels 340, 342, 344, 346 to the UEs 330, 332, 335, the F1 associations 350, 352, 354, 356 may not specify how QoS enforcement is accomplished on the wireless backhaul.

Figure 4:
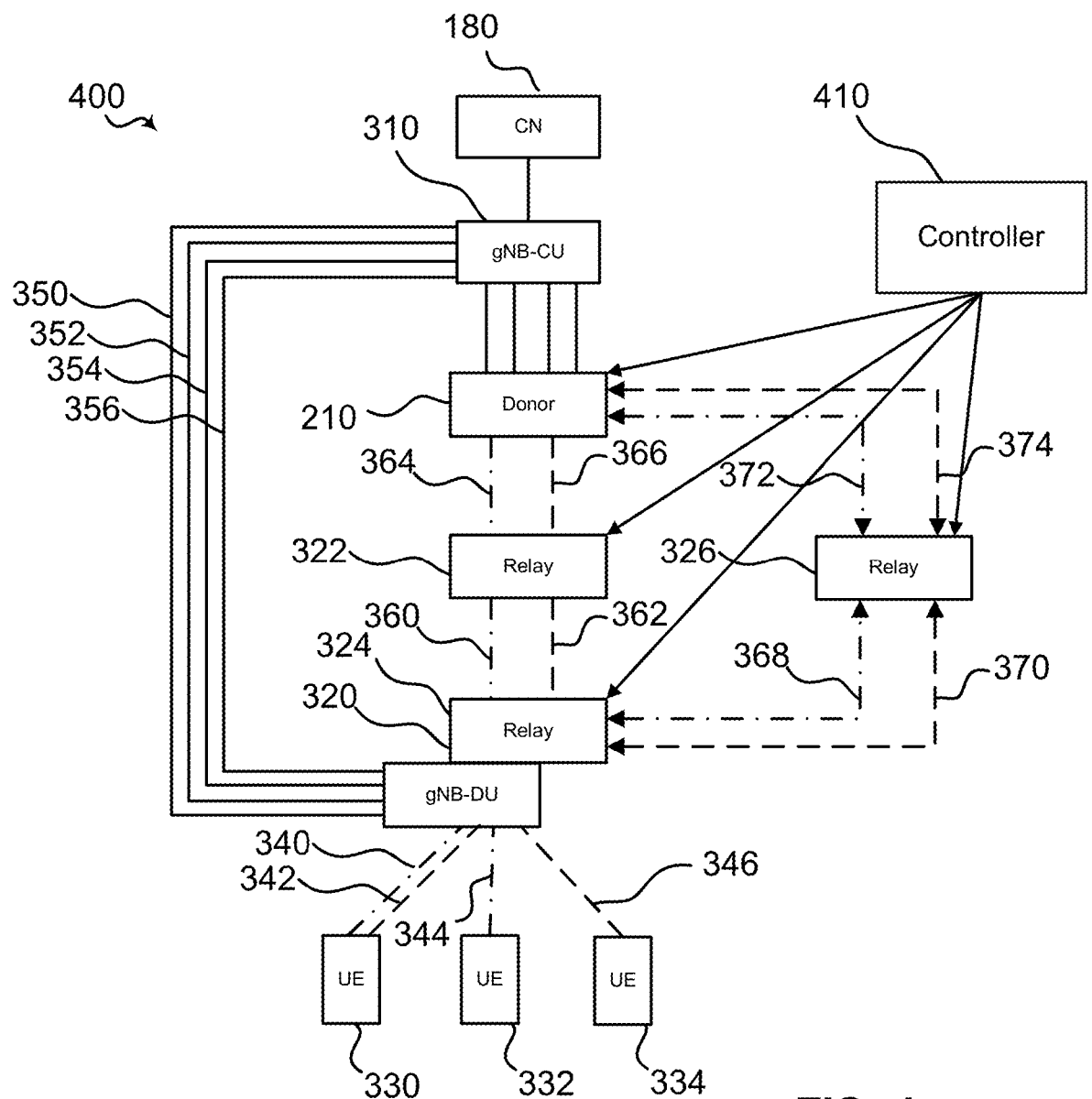
FIG. 4 is a network diagram of an example wireless backhaul network enforcing QoS on a fronthaul between a gNB distributed unit and a gNB central unit.

Referring to FIG. 4, a network diagram shows how QoS is enforced on the wireless backhaul network 400, which may be similar to the wireless backhaul network 300 shown in FIG. 3.

On each backhaul link between the donor node 210 and a relay node 322, 326, or between two relay nodes 322, 324, 326, a controller 410 configures a separate RLC-channel (or radio bearer) 360, 362, 364, 366, 368, 370, 372, 374 for each service class supported together with a corresponding QoS-class ID. For example, the RLC-channel 360 may support QoS class 1, and the RLC-Channel 362 may support QoS class 2 between relay node 324 and relay node 322. As another example, the RLC-channel 364 may support QoS class 1, and the RLC-Channel 366 may support QoS class 2 between relay node 322 and donor node 210. As another example, the RLC-channel 368 may support QoS class 1, and the RLC-Channel 370 may support QoS class 2 between relay node 324 and relay node 326. As another example, the RLC-channel 372 may support QoS class 1, and the RLC-Channel 374 may support QoS class 2 between relay node 326 and donor node 210. When a UE 104 accesses a gNB-DU 320 on a relay node 324, the controller 410 configures on the relay node 324 and the donor node 210 a mapping between each of the UE's access RLC-channels and a corresponding QoS-class supported on the backhaul link.

Forwarding of user data packets between the relay node 324 and the donor node 210 across the backhaul network may be based on the QoS-class ID which may be carried in an adaptation-layer header inserted into a L2 header stack. The adaptation-layer header may further carry a bearer identifier, which may be configured by the controller 410, e.g., the central unit-control (CU-C) plane. The adaptation-layer header may further carry a routing ID and potentially other information configured by the controller 410. The routing ID may be used by intermediate relay nodes 322, 324 to determine the forwarding direction based on a forwarding table, which is also configured by the controller 410. The relay node 324 and the donor node 210, for instance, may use such a routing ID and routing table to determine if data exchange occurs via a first relay node 322 or a second relay node 326.

The adaptation-layer header may reside above or below the RLC header, or may be merged with the RLC header. The adaptation-layer header may also reside above the PDCP header or the SDAP header or be merged with one of these headers. The adaptation-layer header may also be split into two layers, e.g. where one carries end-to-end information such as the bearer ID while the other layer carriers the QoS-class ID and the routing ID, both of which are evaluated hop-by-hop. Further, information already carried on L2 headers may be used or extended to carry QoS-class ID or routing ID. For instance, the range of the Logical Channel ID (LCD) may be extended and used to interconnect RLC channels or radio bearers in a hop-by-hop manner.

In an aspect, the present disclosure is applicable for a central unit (CU)-distributed unit (DU) split architecture, where each relay holds a gNB-DU for access and supports RLC channels or radio bearers on each backhaul link. The present disclosure is also applicable to scenarios where each relay holds full gNB functionality on the relay for UE-access.

Figure 5A:
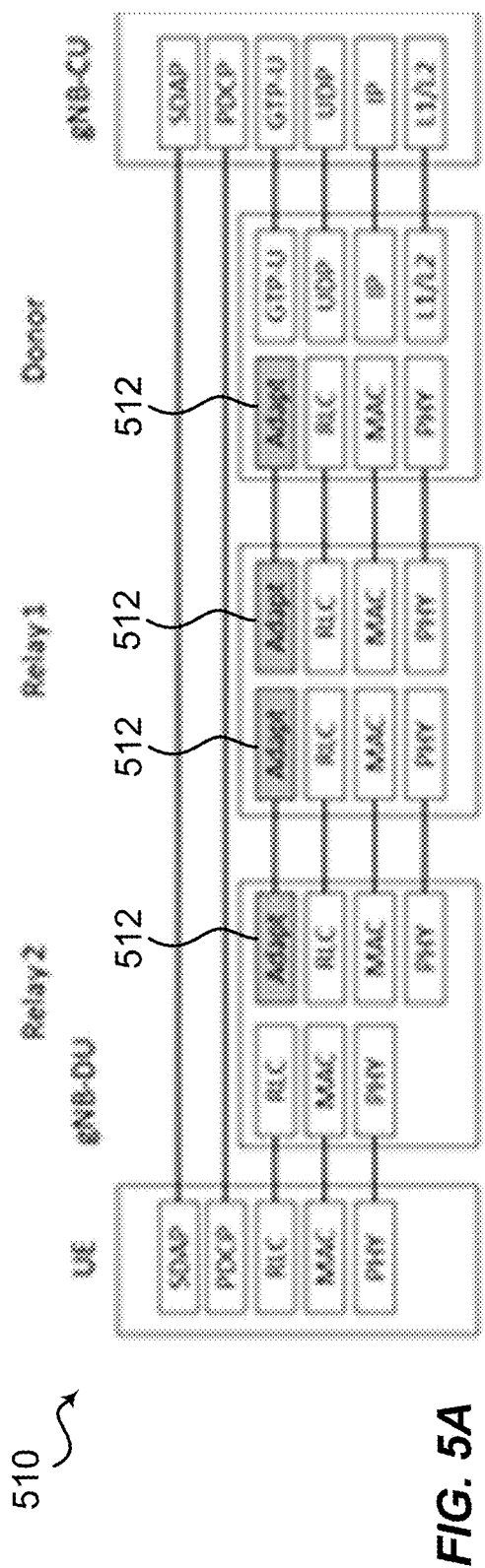

Referring to FIGS. 5A-5D, examples of protocol stacks that allow QoS-enforcement on the wireless backhaul are illustrated. An adaptation layer 512 is inserted into the protocol stack to convey QoS information or routing information. For example, the adaptation layer 512 may include a header including priority ID, bearer ID, and/or route ID. FIG. 5A shows an example protocol stack 510 for the architecture of FIG. 4, where a separate RLC channel is established for each QoS class on each backhaul link. The adaptation layer 512 is carried on top of the RLC channel in this example.

Figure 5B:
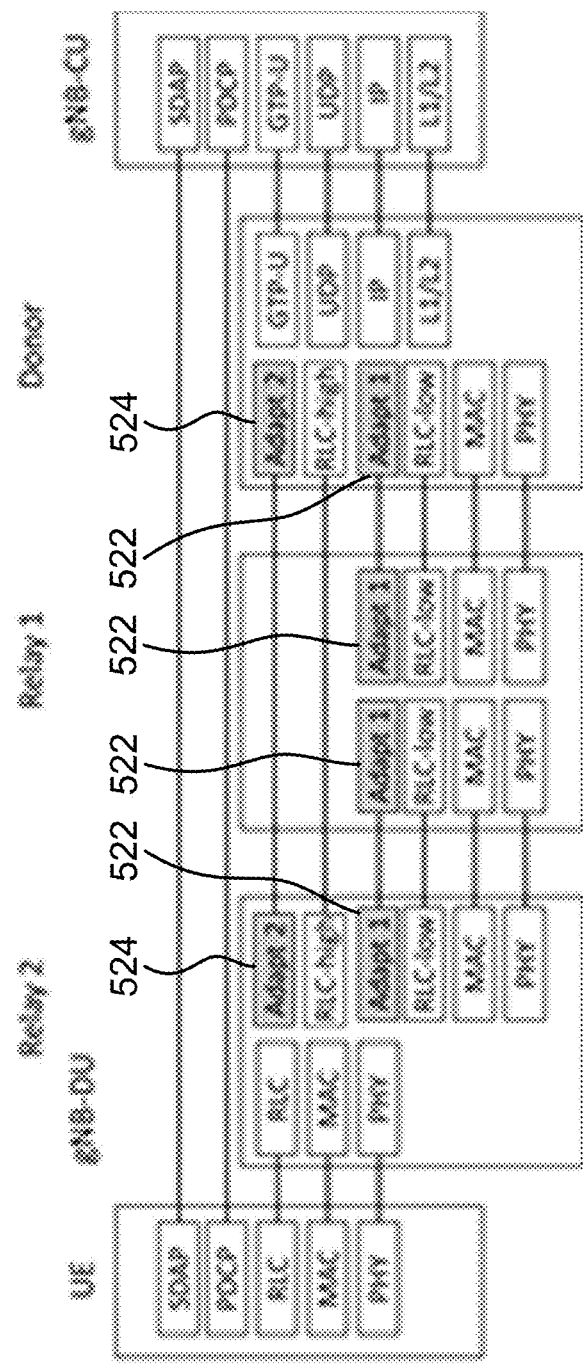

In the protocol stack 520 of FIG. 5B, the RLC layer is split into a lower portion (RLC-low), which may, e.g., perform segmentation tasks, and a higher portion (RLC-high), which may, e.g., perform automatic repeat request (ARQ). The adaptation layer 512 is split into a hop-by-hop adaptation layer (Adapt 1) 522, which may hold QoS-class ID and Route ID, and end-to-end adaptation layer (Adapt 2) 524, which may hold the bearer ID.

In the protocol stack 530 of FIG. 5C, a separate radio bearer is established for each QoS class on each backhaul link. The adaptation layer 512 is carried on top of SDAP/PDCP in this example.

In the protocol stack 540 of FIG. 5D, Relay 2 holds a full gNB (CU and DU protocols) instead of just a gNB-DU, and the backhaul communicatively couples the gNB with a UPF. The wireless backhaul enforces QoS in the same manner as in FIG. 5C with the adaptation layer 512 carried on top of SDAP/PDCP. Additionally, the donor node may be split into a distributed entity and a centralized entity, which are interconnected via a wireline network, while only the distributed donor entity supports wireless backhaul links. In such an arrangement, the adaptation layer 512 may be terminated at the centralized entity and carried over the wireline entity, e.g., on top of UDP/IP or GTP-U/UDP/IP.

Figure 6:
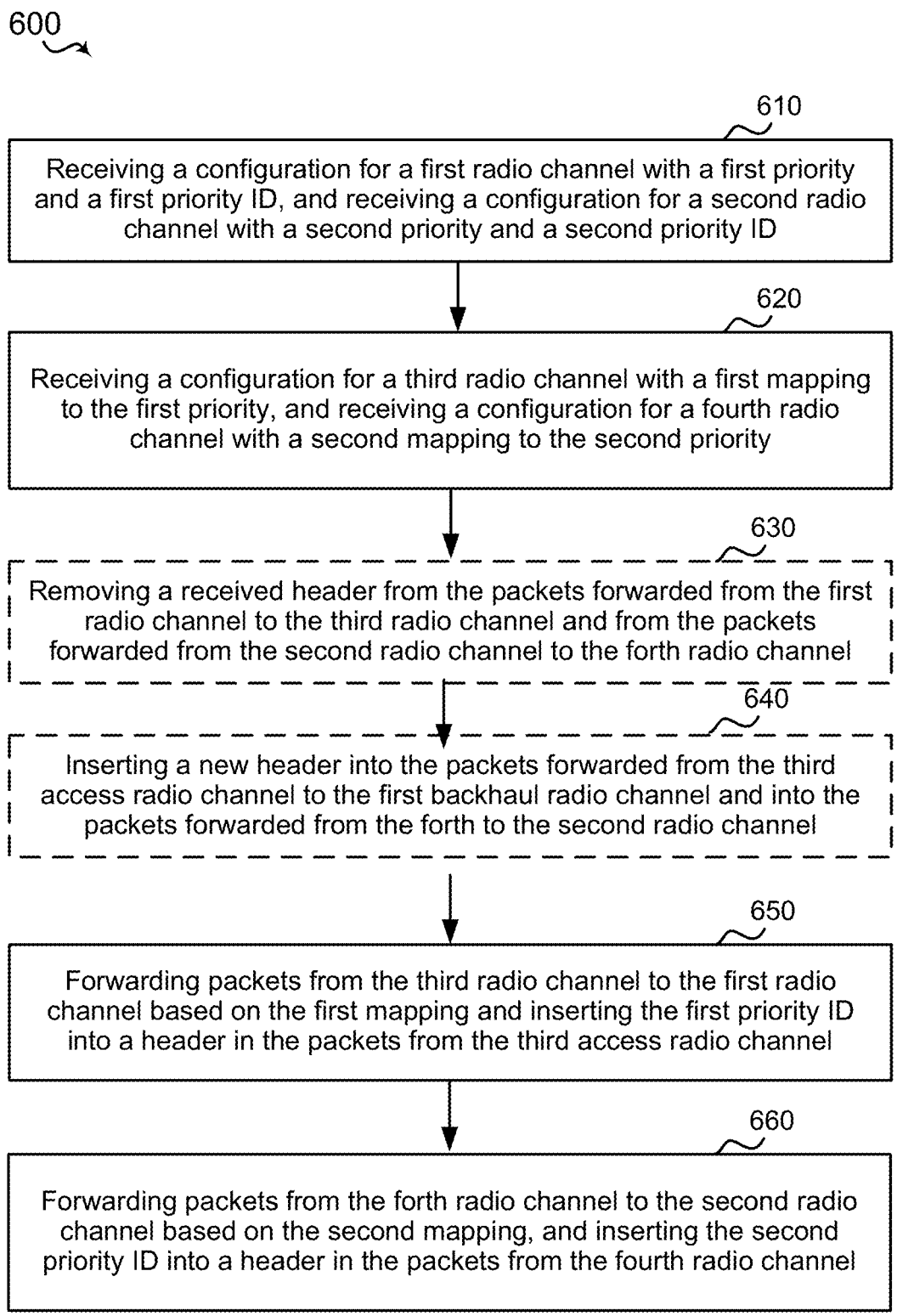
FIG. 6 is a flow diagram of an example of a method of operating a relay node to provide QoS over a wireless backhaul.

Referring to FIG. 6, for example, a method 600 of wireless communication in operating a relay node 220 according to the above-described aspects to provide QoS over a wireless backhaul includes one or more of the herein-defined actions. For example, the relay node 220 may include a gNB-DU 320 or may be an intermediate relay node.

For example, at 610 method 600 includes receiving a configuration for a first radio channel with a first priority and a first priority ID, and receiving a configuration for a second radio channel with a second priority and a second priority ID. For instance, in an aspect, relay node 220 may execute relay QoS component 150 to receive a configuration for a first radio channel 151 with a first priority and a first priority ID, and receive a configuration for a second radio channel 152 with a second priority and a second priority ID, as described herein. The configurations may be received from the controller 410. The first radio channel and the second radio channel may each be backhaul radio channels to a first peer (e.g., donor node 210).

At 620, the method 600 includes receiving a configuration for a third radio channel with a first bearer ID and a first mapping to the first priority, and receiving a configuration for a fourth radio channel with a second bearer ID and a second mapping to the second priority. For instance, in an aspect, relay node 220 may execute relay QoS component 150 to receive a configuration from the controller 410 for a third radio channel 153 with a first bearer ID and a first mapping 155 to the first priority, and receive a configuration for a fourth radio channel 154 with a second bearer ID and a second mapping 156 to the second priority. When the relay node 220 includes a gNB-DU 320 providing access to a UE 104, the third radio channel 153 and the fourth radio channel 154 may each be access radio channels to a UE 104. When the relay node 220 is an intermediate relay node, the third radio channel 153 and the fourth radio channel 154 may each be backhaul radio channels to a second peer (e.g., an access relay node).

At 630, the method 600 may optionally include removing a received header from the packets forwarded from the first radio channel to the third radio channel and from the packets forwarded from the second radio channel to the fourth radio channel. For instance, in an aspect, relay node 220 may execute relay QoS component 150 to remove a received header from the packets forwarded from the first radio channel to the third radio channel and from the packets forwarded from the second radio channel to the fourth radio channel. The received header may, for example, include a priority ID and/or bearer ID for a previous hop. By removing the received header, the packet may be routed according to the configured mapping. Further, the received header may be an adaptation layer header that is not applicable to an access radio channel.

At 640, the method 600 may optionally include inserting a new header into the packets forwarded from the third access radio channel to the first backhaul radio channel and into the packets forwarded from the fourth radio channel to the second radio channel. For instance, in an aspect, relay node 220 may execute relay QoS component 150 to insert a new header into the packets forwarded from the third access radio channel to the first backhaul radio channel and into the packets forwarded from the fourth radio channel to the second radio channel. For example, the new header may be an adaptation layer header. The new header may include fields for the priority ID and the bearer ID.

At 650, the method 600 includes forwarding packets from the third access radio channel to the first backhaul radio channel based on the first mapping and inserting the first priority ID into a header in the packets from the third access radio channel. For instance, in an aspect, relay node 220 may execute relay QoS component 150 to forward packets from the third radio channel 153 to the first radio channel 151 based on the first mapping 155 and inserting the first priority ID into a header in the packets from the third radio channel 153, which may be an access radio channel.

At 660, the method 600 includes forwarding packets from the fourth radio channel to the second radio channel based on the second mapping, and inserting the second priority ID into a header in the packets from the fourth radio channel. For instance, in an aspect, relay node 220 may execute relay QoS component 150 to forward packets from the fourth radio channel 154 to the second radio channel 152 based on the second mapping 156, and insert the second priority ID into a header in the packets from the fourth radio channel.

Figure 7:
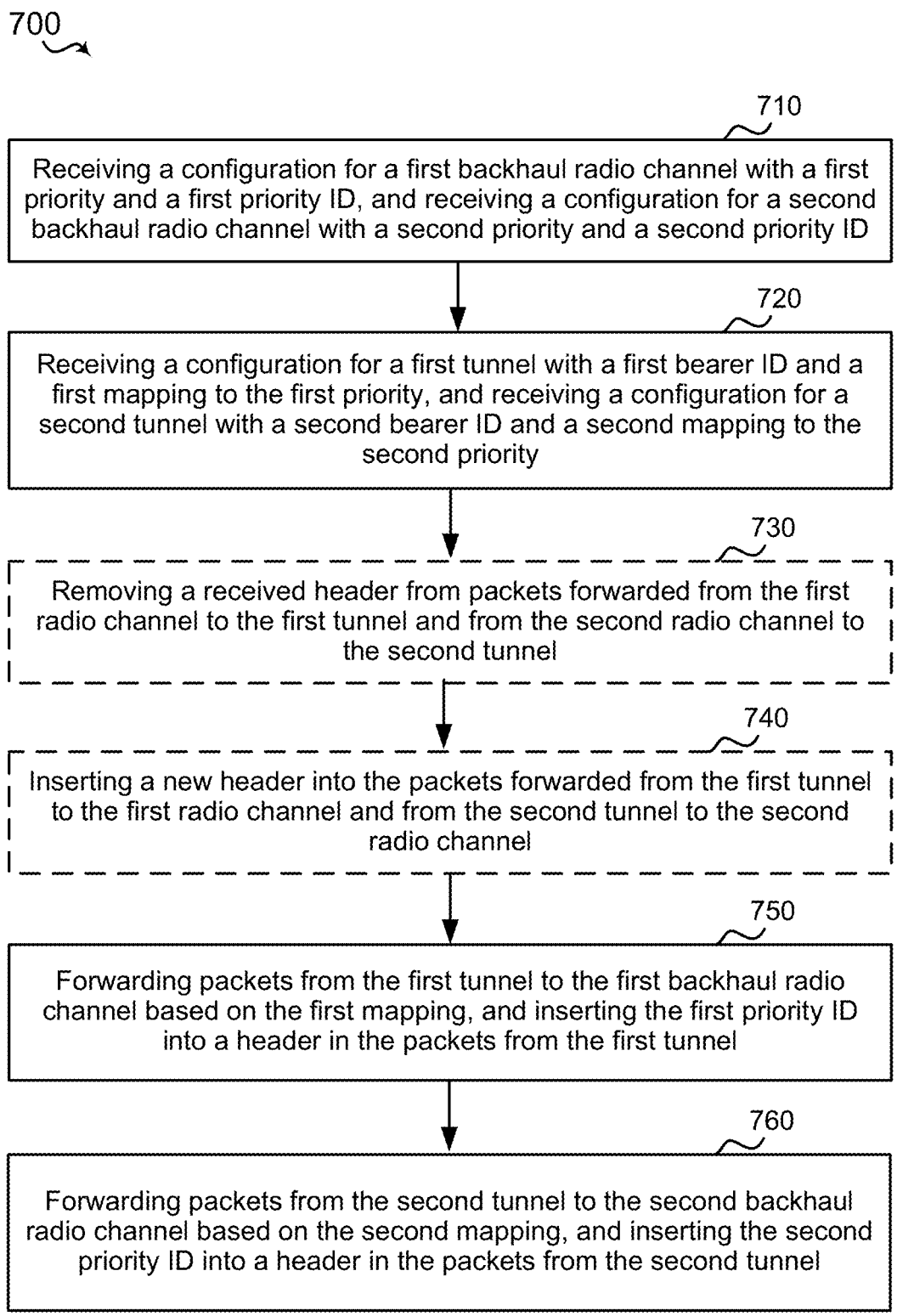
FIG. 7 is a flow diagram of an example of a method of operating a donor node to provide QoS over a wireless backhaul.

Referring to FIG. 7, for example, a method 700 of wireless communication in operating a donor node 210 according to the above-described aspects to provide QoS over a wireless backhaul includes one or more of the herein-defined actions. For example, the donor node 210 may include a wired connection to a gNB-CU 310 including tunnels.

For example, at 710 method 700 includes receiving a configuration for a first backhaul radio channel with a first priority and a first priority ID, and receiving a configuration for a second backhaul radio channel with a second priority and a second priority ID. For instance, in an aspect, donor node 210 may execute donor QoS component 170 to receive a configuration for a first radio channel 171, which may be a backhaul radio channel, with a first priority and a first priority ID, and receive a configuration for a second radio channel 172, which may also be a backhaul radio channel, with a second priority and a second priority ID, as described herein. The configurations may be received from the controller 410. The first radio channel 171 and the second radio channel 172 may each be backhaul radio channels to a first peer (e.g., a relay node 220).

At 720, the method 700 includes receiving a configuration for a first tunnel with a first bearer ID and a first mapping to the first priority, and receiving a configuration for a second tunnel with a second bearer ID and a second mapping to the second priority. For instance, in an aspect, donor node 210 may execute donor QoS component 170 to receive a configuration for a first tunnel 173 with a first bearer ID and a first mapping 175 to the first priority, and receive a configuration for a second tunnel 174 with a second bearer ID and a second mapping 176 to the second priority.

At 730, the method 700 may optionally include removing a received header from packets forwarded from the first radio channel to the first tunnel and from the second radio channel to the second tunnel. For instance, in an aspect, donor node 210 may execute donor QoS component 170 to remove a received header from packets forwarded from the first radio channel to the first tunnel and from the second radio channel to the second tunnel. The received header may, for example, include a priority ID and/or bearer ID for a previous hop. By removing the received header, the packet may be routed according to the configured mapping.

At 740, the method 700 may optionally include inserting a new header into the packets forwarded from the first tunnel to the first radio channel and from the second tunnel to the second radio channel. For instance, in an aspect, donor node 210 may execute donor QoS component 170 to insert a new header into the packets forwarded from the first tunnel to the first radio channel and from the second tunnel to the second radio channel. For example, the new header may be an adaptation layer header. The new header may include fields for the priority ID and the bearer ID.

At 750, the method 700 includes forwarding packets from the first tunnel to the first backhaul radio channel based on the first mapping, and inserting the first priority ID into a header in the packets from the first tunnel. For instance, in an aspect, donor node 210 may execute donor QoS component 170 to forward packets from the first tunnel 173 to the first radio channel 171, which may be a backhaul radio channel, based on the first mapping 175, and insert the first priority ID into a header in the packets from the first tunnel 173.

At 760, the method 700 includes forwarding packets from the second tunnel to the second backhaul radio channel based on the second mapping, and inserting the second priority ID into a header in the packets from the second tunnel. For instance, in an aspect, donor node 210 may execute donor QoS component 170 to forward packets from the second tunnel 174 to the second radio channel 172, which may be a backhaul radio channel, based on the second mapping 176, and inserting the second priority ID into a header in the packets from the second tunnel.

Figure 8:
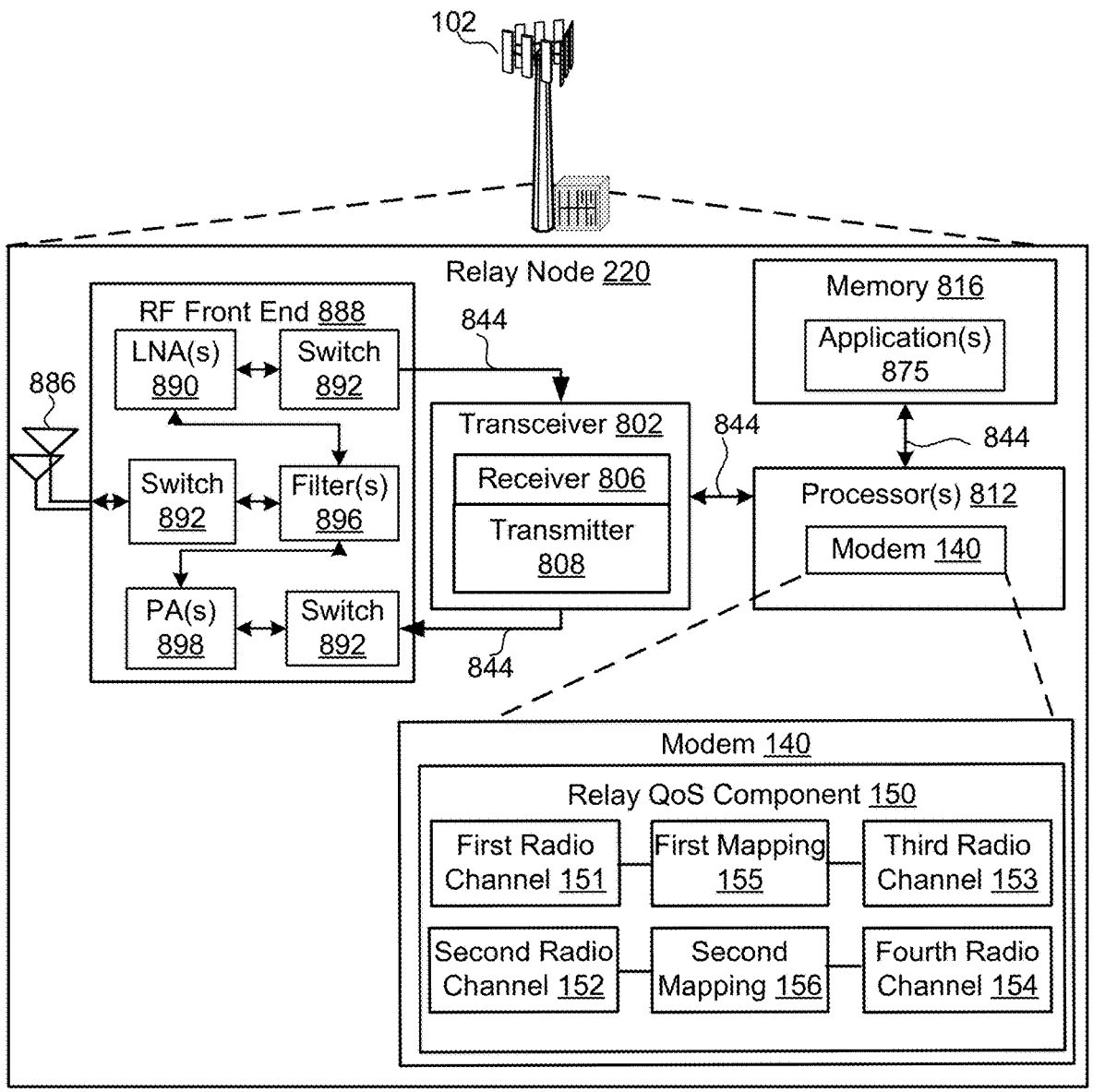
FIG. 8 is a schematic diagram of example components of a relay node of FIG. 1.

Referring to FIG. 8, one example of an implementation of a relay node 220 at a base station 102 may include a variety of components, some of which have already been described above, but including components such as one or more processors 812 and memory 816 and transceiver 802 in communication via one or more buses 844, which may operate in conjunction with modem 140 and relay QoS component 150 to enable one or more of the functions described herein related to providing QoS over a wireless backhaul. Further, the one or more processors 812, modem 814, memory 816, transceiver 802, RF front end 888 and one or more antennas 886, may be configured to support voice and/or data calls (simultaneously or non-simultaneously) in one or more radio access technologies.

In an aspect, the one or more processors 812 can include a modem 814 that uses one or more modem processors. The various functions related to relay QoS component 150 may be included in modem 140 and/or processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 140 associated with relay QoS component 150 may be performed by transceiver 802.

Also, memory 816 may be configured to store data used herein and/or local versions of applications 875 or relay QoS component 150 and/or one or more of its subcomponents being executed by at least one processor 812. Memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining relay QoS component 150 and/or one or more of its subcomponents, and/or data associated therewith, when base station 102 is operating at least one processor 812 to execute relay QoS component 150 and/or one or more of its subcomponents.

Transceiver 802 may include at least one receiver 806 and at least one transmitter 808. Receiver 806 may include hardware, firmware, and/or software code executable by a processor for receiving data, the code comprising instructions and being stored in a memory (e.g., computer-readable medium). Receiver 806 may be, for example, a radio frequency (RF) receiver. In an aspect, receiver 806 may receive signals transmitted by at least one other base station 102. Additionally, receiver 806 may process such received signals, and also may obtain measurements of the signals, such as, but not limited to, Ec/Io, SNR, RSRP, RSSI, etc. Transmitter 808 may include hardware, firmware, and/or software code executable by a processor for transmitting data, the code comprising instructions and being stored in a memory (e.g., computer-readable medium). A suitable example of transmitter 808 may including, but is not limited to, an RF transmitter.

Moreover, in an aspect, relay node 220 may include RF front end 888, which may operate in communication with one or more antennas 865 and transceiver 802 for receiving and transmitting radio transmissions, for example, wireless communications transmitted by at least one UE 104 or wireless transmissions transmitted by another base station 102. RF front end 888 may be connected to one or more antennas 865 and can include one or more low-noise amplifiers (LNAs) 890, one or more switches 892, one or more power amplifiers (PAs) 898, and one or more filters 896 for transmitting and receiving RF signals.

In an aspect, LNA 890 can amplify a received signal at a desired output level. In an aspect, each LNA 890 may have a specified minimum and maximum gain values. In an aspect, RF front end 888 may use one or more switches 892 to select a particular LNA 890 and its specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 can be used by RF front end 888 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 890 and/or PA 898. In an aspect, RF front end 888 can use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver may be tuned to operate at specified frequencies such that relay node 220 can communicate with, for example, one or more UEs 104 or one or more cells associated with one or more base stations 102. In an aspect, for example, modem 140 can configure transceiver 802 to operate at a specified frequency and power level based on the base station configuration of the relay node 220 and the communication protocol used by modem 140.

In an aspect, modem 140 can be a multiband-multimode modem, which can process digital data and communicate with transceiver 802 such that the digital data is sent and received using transceiver 802. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of base station 102 (e.g., RF front end 888, transceiver 802) to enable transmission and/or reception of signals from the network based on a specified modem configuration. In an aspect, the modem configuration can be based on the mode of the modem and the frequency band in use.

Figure 9:
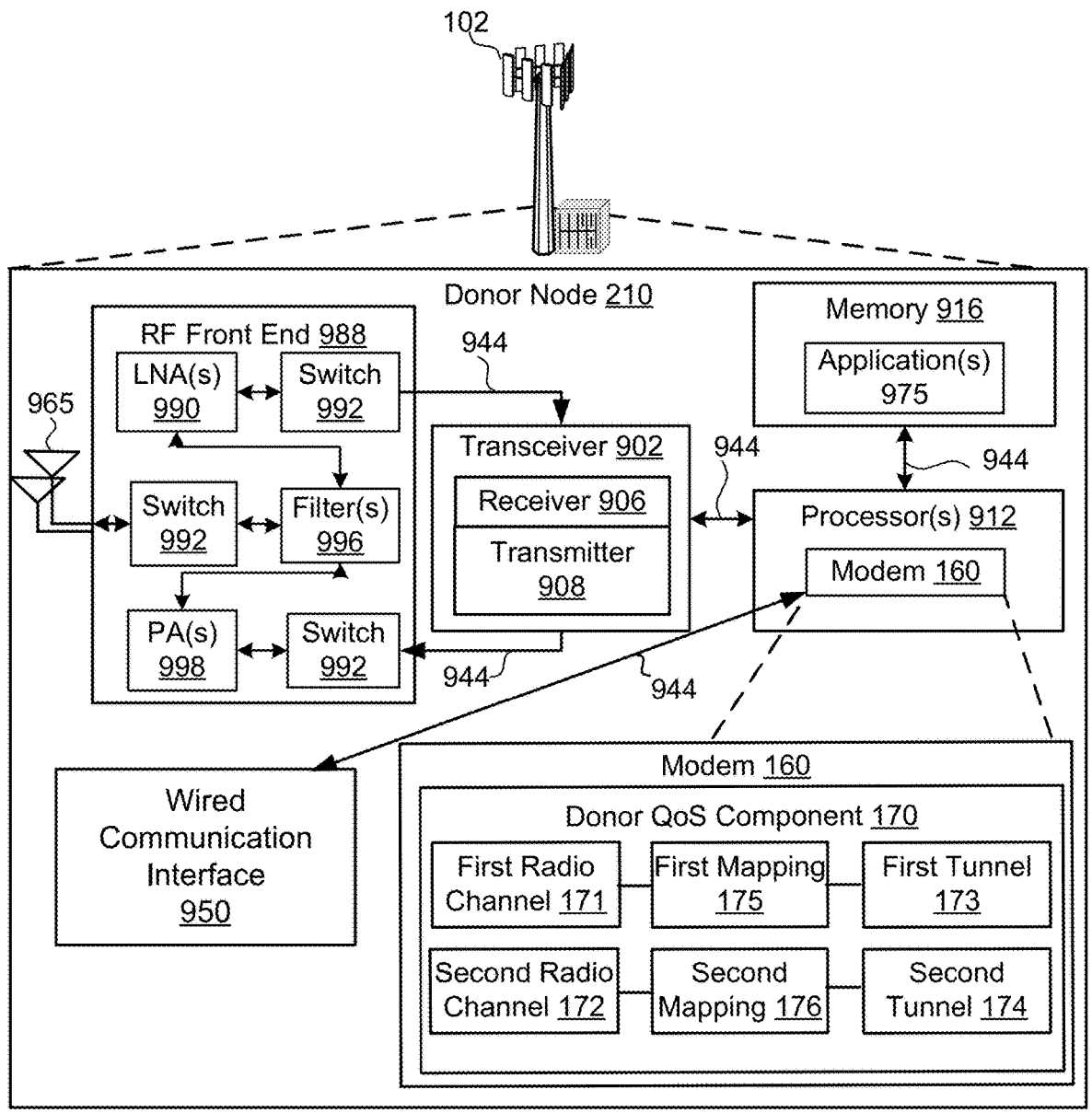
FIG. 9 is a schematic diagram of example components of a donor node of FIG. 1.

Referring to FIG. 9, one example of an implementation of a base station 102 as a donor node 210 may include a variety of components, some of which have already been described above, but including components such as one or more processors 912 and memory 916 and transceiver 902 in communication via one or more buses 944, which may operate in conjunction with modem 160 and donor QoS component 170 to enable one or more of the functions described herein related to providing QoS over a wireless backhaul. In another example, the donor node 210 may include a wired communication interface 950 which may operate in conjunction with modem 160 and donor QoS component 170 to enable one or more of the functions described herein related to providing QoS for a wireless backhaul terminating at the donor node 210.

The transceiver 902, receiver 906, transmitter 908, one or more processors 912, memory 916, applications 975, buses 944, RF front end 988, LNAs 990, switches 992, filters 996, PAs 998, and one or more antennas 965 may be the same as or similar to the corresponding components of relay node 220, as described above, but configured or otherwise programmed for donor node operations as opposed to relay node operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications for a relay node, comprising:
   receiving a configuration for a first radio channel with a first priority and a first priority ID, and receiving a configuration for a second radio channel with a second priority and a second priority ID;
   receiving a configuration for a third radio channel with a first mapping to the first priority, and receiving a configuration for a fourth radio channel with a second mapping to the second priority;
   forwarding packets from the third radio channel to the first radio channel based on the first mapping and inserting the first priority ID into a header in the packets from the third radio channel; and
   forwarding packets from the fourth radio channel to the second radio channel based on the second mapping, and inserting the second priority ID into a header in the packets from the fourth radio channel.

2. The method of claim 1, wherein the first radio channel and the second radio channel are backhaul radio channels and the third radio channel and the fourth radio channel are access radio channels, wherein the configuration of the third radio channel includes a first bearer ID and the configuration of the fourth radio channel includes a second bearer ID.

3. The method of claim 1, wherein the first radio channel and the second radio channel are backhaul radio channels to a first peer, and wherein the third radio channel and the fourth radio channel are backhaul radio channels to a second peer.

4. The method of claim 1, wherein the first radio channel or the second radio channel is one of a cellular radio link control (RLC)-channel or a cellular radio bearer.

5. The method of claim 4, wherein the cellular radio bearer is a data radio bearer or a signaling radio bearer.

6. The method of claim 1, wherein the configuration of the first radio channel or the configuration of the second radio channel also includes a route-ID, the method further comprising inserting the route-ID into the header in packets forwarded on the corresponding radio channel.

7. The method of claim 1, further comprising inserting the header into the packets forwarded from the third radio channel to the first radio channel and into the packets forwarded from the fourth to the second radio channel, wherein the header carries the priority ID and a bearer ID.

8. The method of claim 7, further comprising removing a header from the packets forwarded from the first radio channel to the third radio channel and from the packets forwarded from the second radio channel to the fourth radio channel.

9. The method of claim 1, wherein the forwarding comprises forwarding packets arriving on the first radio channel or the second radio channel to the third radio channel or the fourth radio channel based on a bearer ID or a priority ID carried in a header of the packets.

10. The method of claim 1, wherein the configurations are received from an Integrated Access and Backhaul (IAB) control function or a central unit controller (CU-C).

11. The method of claim 1, further comprising:
    forwarding packets from the first radio channel to the third radio channel based on the first mapping and inserting the first priority ID into a header in the packets from the first radio channel; and
    forwarding packets from the second radio channel to the fourth radio channel based on the second mapping, and inserting the second priority ID into a header in the packets from the second radio channel.

12. A base station, comprising:
    a memory; and
    a processor in communication with the memory, wherein the processor is configured to:
    receive a configuration for a first radio channel with a first priority and a first priority ID, and receiving a configuration for a second radio channel with a second priority and a second priority ID;
    receive a configuration for a third radio channel with a first mapping to the first priority, and receiving a configuration for a fourth radio channel with a second mapping to the second priority;
    forward packets from the third radio channel to the first radio channel based on the first mapping and inserting the first priority ID into a header in the packets from the third radio channel; and
    forward packets from the fourth radio channel to the second radio channel based on the second mapping, and inserting the second priority ID into a header in the packets from the fourth radio channel.

13. The base station of claim 12, wherein the first radio channel and the second radio channel are backhaul radio channels and the third radio channel and the fourth radio channel are access radio channels, wherein the configuration of the third radio channel includes a first bearer ID and the configuration of the fourth radio channel includes a second bearer ID.

14. The base station of claim 12, wherein the first radio channel and the second radio channel are backhaul radio channels to a first peer, and wherein the third radio channel and the fourth radio channel are backhaul radio channels to a second peer.

15. The base station of claim 12, wherein the first radio channel or the second radio channel is one of a cellular radio link control (RLC)-channel or a cellular radio bearer.

16. The base station of claim 15, wherein the cellular radio bearer is a data radio bearer or a signaling radio bearer.

17. The base station of claim 12, wherein the configuration of the first radio channel or the configuration of the second radio channel also includes a route-ID, and the processor is configured to insert the route-ID into the header in packets forwarded on the corresponding radio channel.

18. The base station of claim 12, wherein the processor is configured to insert the header into the packets forwarded from the third radio channel to the first radio channel and into the packets forwarded from the fourth to the second radio channel, wherein the header carries the priority ID and a bearer ID.

19. The base station of claim 12, wherein the processor is configured to remove a header from the packets forwarded from the first radio channel to the third radio channel and from the packets forwarded from the second radio channel to the fourth radio channel.

20. The base station of claim 12, wherein the processor is configured to forward packets arriving on the first radio channel or the second radio channel to the third radio channel or the fourth radio channel based on a bearer ID or a priority ID carried in a header of the packets.

21. The base station of claim 12, wherein the configurations are received from an Integrated Access and Backhaul (IAB) control function or a central unit controller (CU-C).

22. The base station of claim 12, wherein the processor is configured to:
forward packets from the first radio channel to the third radio channel based on the first mapping and inserting the first priority ID into a header in the packets from the first radio channel; and
forward packets from the second radio channel to the fourth radio channel based on the second mapping, and inserting the second priority ID into a header in the packets from the second radio channel.

23. A base station, comprising:
means for receiving a configuration for a first radio channel with a first priority and a first priority ID, and receiving a configuration for a second radio channel with a second priority and a second priority ID;
means for receiving a configuration for a third radio channel with a first mapping to the first priority, and receiving a configuration for a fourth radio channel with a second mapping to the second priority;
means for forwarding packets from the third radio channel to the first radio channel based on the first mapping and inserting the first priority ID into a header in the packets from the third radio channel; and
means for forwarding packets from the fourth radio channel to the second radio channel based on the second mapping, and inserting the second priority ID into a header in the packets from the fourth radio channel.

24. A non-transitory computer-readable medium storing computer code executable by a processor for wireless communications, comprising one or more codes executable to:
receive a configuration for a first radio channel with a first priority and a first priority ID, and receiving a configuration for a second radio channel with a second priority and a second priority ID;
receive a configuration for a third radio channel with a first mapping to the first priority, and receiving a configuration for a fourth radio channel with a second mapping to the second priority;
forward packets from the third radio channel to the first radio channel based on the first mapping and inserting the first priority ID into a header in the packets from the third radio channel; and
forward packets from the fourth radio channel to the second radio channel based on the second mapping, and inserting the second priority ID into a header in the packets from the fourth radio channel.

25. A method of wireless communications for a donor node, comprising:
receiving a configuration for a first backhaul radio channel with a first priority and a first priority ID, and receiving a configuration for a second backhaul radio channel with a second priority and a second priority ID;
receiving a configuration for a first tunnel with a first bearer ID and a first mapping to the first priority, and receiving a configuration for a second tunnel with a second bearer ID and a second mapping to the second priority;
forwarding packets from the first tunnel to the first backhaul radio channel based on the first mapping, and inserting the first priority ID into a header in the packets from the first tunnel; and
forwarding packets from the second tunnel to the second backhaul radio channel based on the second mapping, and inserting the second priority ID into a header in the packets from the second tunnel.

26. The method of claim 25, wherein the first backhaul radio channel or the second backhaul radio channel is one of a cellular radio link control (RLC)-channel, a cellular data radio bearer, or a cellular signaling radio bearer.

27. The method of claim 25, wherein the configuration of the first backhaul radio channel or the second backhaul radio channel includes a route-ID, the method further comprising inserting the route-ID into a header in packets forwarded on the corresponding radio channel.

28. The method of claim 25, further comprising inserting a new header into the packets forwarded from the first tunnel to the first backhaul radio channel and from the second tunnel to the second backhaul radio channel, wherein the header carries the priority ID and the bearer ID.

29. The method of claim 25, further comprising removing a received header from packets forwarded from the first backhaul radio channel to the first tunnel and from the second backhaul radio channel to the second tunnel.

30. The method of claim 25, wherein packets arriving on the first backhaul radio channel or the second backhaul radio channel are forwarded to the first or second tunnel based on the bearer ID or the priority ID carried in a header of the packets.

31. The method of claim 25, wherein the configurations are received from an Integrated Access and Backhaul (IAB) control function or a central unit controller (CU-C).

32. A base station, comprising:
a memory; and
a processor in communication with the memory, wherein the processor is configured to:
receive a configuration for a first backhaul radio channel with a first priority and a first priority ID, and receiving a configuration for a second backhaul radio channel with a second priority and a second priority ID;
receive a configuration for a first tunnel with a first bearer ID and a first mapping to the first priority, and receiving a configuration for a second tunnel with a second bearer ID and a second mapping to the second priority;
forward packets from the first tunnel to the first backhaul radio channel based on the first mapping, and inserting the first priority ID into a header in the packets from the first tunnel; and
forward packets from the second tunnel to the second backhaul radio channel based on the second mapping, and inserting the second priority ID into a header in the packets from the second tunnel.

33. The base station of claim 32, wherein the first backhaul radio channel or the second backhaul radio channel is one of a cellular radio link control (RLC)-channel, a cellular data radio bearer, or a cellular signaling radio bearer.

34. The base station of claim 32, wherein the configuration of the first backhaul radio channel or the second backhaul radio channel includes a route-ID, the method further comprising inserting the route-ID into a header in packets forwarded on the corresponding radio channel.

35. The base station of claim 32, wherein the processor is configured to insert a new header into the packets forwarded from the first tunnel to the first backhaul radio channel and from the second tunnel to the second backhaul radio channel, wherein the header carries the priority ID and the bearer ID.

36. The base station of claim 32, wherein the processor is configured to remove a received header from packets forwarded from the first backhaul radio channel to the first tunnel and from the second backhaul radio channel to the second tunnel.

37. The base station of claim 32, wherein packets arriving on the first backhaul radio channel or the second backhaul radio channel are forwarded to the first or second tunnel based on the bearer ID or the priority ID carried in a header of the packets.

38. The base station of claim 32, wherein the configurations are received from an Integrated Access and Backhaul (IAB) control function or a central unit controller (CU-C).

39. A base station, comprising:
 means for receiving a configuration for a first backhaul radio channel with a first priority and a first priority ID, and receiving a configuration for a second backhaul radio channel with a second priority and a second priority ID;
 means for receiving a configuration for a first tunnel with a first bearer ID and a first mapping to the first priority, and receiving a configuration for a second tunnel with a second bearer ID and a second mapping to the second priority;
 means for forwarding packets from the first tunnel to the first backhaul radio channel based on the first mapping, and inserting the first priority ID into a header in the packets from the first tunnel; and
 means for forwarding packets from the second tunnel to the second backhaul radio channel based on the second mapping, and inserting the second priority ID into a header in the packets from the second tunnel.

40. A non-transitory computer-readable medium storing computer code executable by a processor for wireless communications, comprising one or more codes executable to:
 receive a configuration for a first backhaul radio channel with a first priority and a first priority ID, and receiving a configuration for a second backhaul radio channel with a second priority and a second priority ID;
 receive a configuration for a first tunnel with a first bearer ID and a first mapping to the first priority, and receiving a configuration for a second tunnel with a second bearer ID and a second mapping to the second priority;
 forward packets from the first tunnel to the first backhaul radio channel based on the first mapping, and inserting the first priority ID into a header in the packets from the first tunnel; and
 forward packets from the second tunnel to the second backhaul radio channel based on the second mapping, and inserting the second priority ID into a header in the packets from the second tunnel.

* * * * *